United States Patent
Kalevo et al.

(10) Patent No.: US 8,363,892 B2
(45) Date of Patent: Jan. 29, 2013

(54) APPARATUS, METHOD AND COMPUTER PROGRAM PROVIDING IMAGE PROCESSING USING SOFTWARE AND HARDWARE PROCESSING

(75) Inventors: Ossi Kalevo, Toijala (FI); Jouni Karppinen, Tampere (FI); Tero Hiltunen, Tampere (FI)

(73) Assignee: Nokia Corporation, Espoo (FI)

( * ) Notice: Subject to any disclaimer, the term of this patent is extended or adjusted under 35 U.S.C. 154(b) by 1044 days.

(21) Appl. No.: 12/220,565

(22) Filed: Jul. 25, 2008

(65) Prior Publication Data

US 2010/0021062 A1 Jan. 28, 2010

(51) Int. Cl.
*G06K 9/00* (2006.01)
(52) U.S. Cl. .................................... 382/103
(58) Field of Classification Search ............... 382/103, 382/118, 154, 190
See application file for complete search history.

(56) References Cited

U.S. PATENT DOCUMENTS

2009/0010490 A1* 1/2009 Wang et al. ............... 382/103
2010/0021062 A1* 1/2010 Kalevo et al. ............. 382/190

FOREIGN PATENT DOCUMENTS

JP 2006-085414 3/2006
JP 2006-173843 6/2006

* cited by examiner

*Primary Examiner* — Claire X Wang
(74) *Attorney, Agent, or Firm* — Harrington & Smith

(57) ABSTRACT

A method for imaging processing is described. The method includes selecting a first set of image pixels of an input image and a second set of image pixels of the input image based at least in part on a context of the image pixels. Processing the first set of image pixels using hardware based processing to provide a first set of processed pixels is also included in the method. The method includes processing the second set of image pixels using algorithm based processing to provide a second set of processed pixels. The processed sets of pixels are combined to generate an output image. Apparatus and computer-readable media are also described.

30 Claims, 4 Drawing Sheets

APPARATUS, METHOD AND COMPUTER PROGRAM PROVIDING IMAGE PROCESSING USING SOFTWARE AND HARDWARE PROCESSING

TECHNICAL FIELD

The exemplary embodiments of this invention relate generally to image processing and, more specifically, relate to using a combination of software and hardware image processing.

BACKGROUND

This section is intended to provide a background or context to this invention. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that appear in the specification and/or in the drawing figures are defined as follows:
CFAI color filter array interpolation
DPCM differential pulse-code modulation
DSP digital signal processor
FPGA field-programmable gate array
GPU graphics processing unit
HW hardware
ISP image signal processor
LUT look-up table
OTF on-the-fly
PCM pulse-code modulation
ROI region of interest
SIMD single instruction, multiple data
SW software As shown in FIG. 1, a typical camera system 100 contains at least one camera sensor 110, an image processing engine (also called an ISP) 120, which may include an image buffer 125, a compression engine 130 and memory 140 for storing an image file. The camera system 100 may also include a display 150. The camera sensor 110 can capture an image that contains x pixels in the horizontal direction and y pixels in the vertical direction. The image is read from the camera sensor 110 to the image buffer 125. From the image buffer 125, the image can be processed by the ISP 120, compressed by compression unit 130 and then stored in memory 140. Additionally, the image may also be displayed on the display 150 either directly from the ISP 120 or from memory 140.

It is also possible to process images on the fly (OTF), where the image is read from the camera sensor 110 and processed directly without buffering.

Generally, image processing is done either in a software ISP (SW ISP) or in a hardware ISP (HW ISP). Both methods have their own related problems that affect image quality and resources needed from the device. It may also be possible to process images using the HW processing and using SW processing (before or after the HW ISP) for some enhancements or additional processing to the same image pixels.

When an image is processed using only HW processing, the image is typically cropped. As the size of hardware is minimized to conserve space and costs, the processing is also simplified as much as possible. Thus, complex processing (e.g., the processing required for lines or columns in border areas) is simplified and some pixels may not be used for the final output image. Although the camera sensor 110 may contain a large number of pixels (e.g., 5.1 Million pixels), the image file will contain less pixels (e.g., 4.9 Mpix out of the possible 5.1 Million pixels).

Another problem is that typically the quality of the HW processing is not as good as the quality of the SW processing.

When an image is processed using only a SW ISP the processing may be too slow and cause additional delays (latencies, e.g., shot-to-save increases). The problem is more severe if there is no background processing solution used to minimize those latencies (thus shot-to-shot latency also increases).

One solution is to use a larger HW ISP that can process border areas and other pixels properly. However, this may increase both the size and cost of the camera.

Some prior solutions try to combine SW and HW image processing.

The system proposed in JP2006173843 is one such the system. The process splits an image into bands (or slices) that can be processed within a SW ISP or a HW ISP based on the availability of the processing systems. It divides the image into the predetermined slices, but it does not specify which slice is processed with a HW ISP and which slice is processed with a SW ISP except to enhance execution efficiency (and thus reduce processing delays).

Another proposed system is described in JP2006085414. This system is used for image rendering. It utilizes SW processing when the processing requirements exceed the limited HW capabilities. For example, if the image is requested to be zoomed 10 times and the HW is capable of zooming to only 4 times, then the image is temporarily zoomed at least 2.5 times by SW processing and the remainder of the zooming is performed with hardware. Thus, the same image area is processed with a HW ISP and with a SW ISP similarly to other SW enhancement procedures.

Another approach is to use the same HW ISP two (or more) times. This would require a buffering mechanism during processing. A buffering mechanism may also be needed within the combined SW solutions, as typically a SW ISP is not capable of performing OTF processing at the same speed as a HW ISP.

SUMMARY

The following summary provides exemplary and non-limiting example in accordance with this invention.

An exemplary embodiment in accordance with this invention is a method for imaging processing. The method includes selecting a first set of image pixels of an input image and a second set of image pixels of the input image based at least in part on a context of the image pixels. Processing the first set of image pixels using hardware based processing to provide a first set of processed pixels is also included in the method. The method includes processing the second set of image pixels using algorithm based processing to provide a second set of processed pixels. The processed sets of pixels are combined to generate an output image.

A further exemplary embodiment in accordance with this invention is an apparatus for imaging processing. The apparatus including a first processing unit to select a first set of image pixels of an input image and a second set of image pixels of the input image based at least in part on a context of the image pixels. A second processing unit is included to process the first set of image pixels using hardware based processing to provide a first set of processed pixels. The apparatus includes a third processing unit to process the second set of image pixels using algorithm based processing to provide a second set of processed pixels. A fourth processing unit is configured to join the first and second sets of processed pixels to generate an output image is included.

A further exemplary embodiment in accordance with this invention is a computer-readable medium tangibly embodying program instructions, execution of the program instructions resulting in operations for imaging processing. The program instructions resulting in operations including selecting a first set of image pixels of an input image and a second set of image pixels of the input image based at least in part on one or more context of the image pixels. The first set of image pixels are processed using hardware based processing to provide a first set of processed pixels. The second set of image pixels are processed using algorithm based processing to provide a second set of processed pixels. The program instructions include merging the first and second sets of processed pixels to generate an output image.

A further exemplary embodiment in accordance with this invention is an apparatus for imaging processing. The apparatus includes means for selecting a first set of image pixels of an input image and a second set of image pixels of the input image based at least in part on a context of the image pixels. Means for processing the first set of image pixels using hardware based processing to provide a first set of processed pixels is included. The apparatus includes means for processing the second set of image pixels using algorithm based processing to provide a second set of processed pixels. Means for combining the first and second sets of processed pixels to generate an output image is included.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The conventional systems described above do not select which pixel areas are to be processed using the SW ISP or the HW ISP based on the image areas being processed. The exemplary embodiments in accordance with this invention remedy this deficiency Exemplary embodiments in accordance with this invention selectively use software and hardware image processing based on a selected area of the image being processed.

Combining both SW processing and HW processing allows for minimizing resource requirements for both processing systems. Also, combined processing can be used to highlight certain areas in image as software processing may provide better quality processing than hardware processing. In some situations, differences in areas in the end results of the different processing methods may be joined together with areas of similar level of quality to create a more seamless combination.

Some image regions are processed using a SW ISP and other image regions are processed with a HW ISP. Using such an implementation, the speed of the HW ISP can be utilized in the areas where it is efficient and produce output image areas of sufficient quality. SW processing may be used for areas that are not easily processed within the HW ISP (e.g., borders regions) and/or areas that requires higher image quality (e.g., a region of interest (ROI)). The SW processed region(s) can be fixed (e.g., border regions or fixed text areas), or selected dynamically based on another context of the image (e.g., a region of interest may be defined based on face detection or object tracking). When selecting regions of the image for processing the context of the image may be determined either by using the current image, one or more recent previous images, and/or a combination of the two.

It is possible to perform additional SW or HW processing functions for the entire image area, but these functions may be processed in different areas within the HW or SW ISP (e.g., CFAI, noise reduction, quality assessment, sharpening).

An exemplary embodiment in accordance with this invention enables border pixels that cannot be readily processed within a hardware based ISP to be processed within an algorithmically based ISP (e.g., a SW ISP). Thus, the full image (e.g., 5.1 Mpix) can be stored in the compressed image file. Since the algorithmically processed image area is small (typically only a small percentage of the image), it also avoids large processing latencies in the system.

Figure 1:
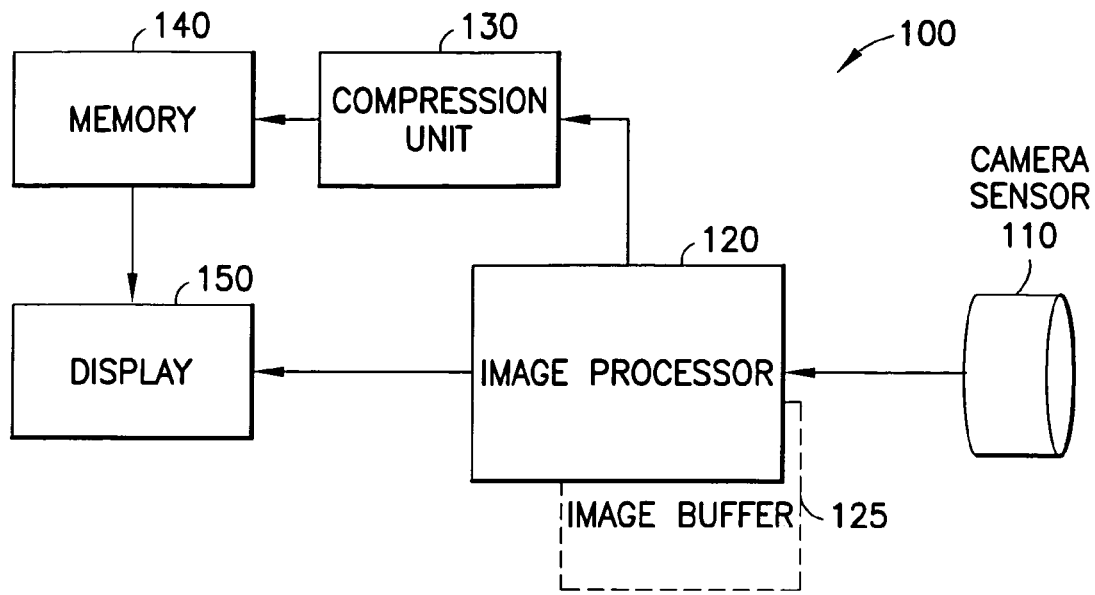
FIG. 1 illustrates a simplified block diagram of an image processing device.
Figure 2:
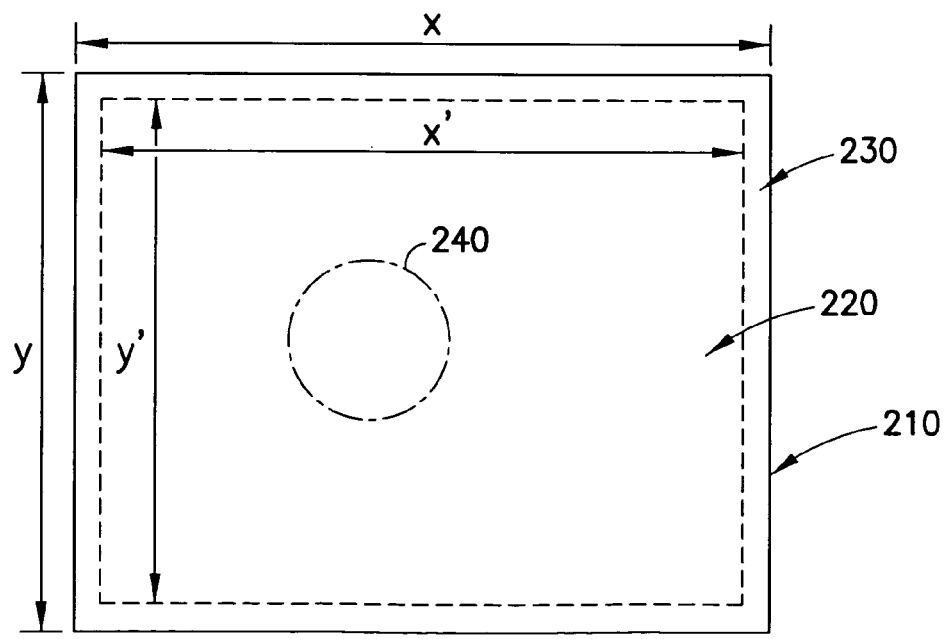
FIG. 2 illustrates the various areas of an example image and image file.

FIG. 2 illustrates the various areas of an example image. As shown, captured image 210 has x×y pixels. In prior systems, HW processing resulted in an image file containing a smaller image 220 having x'×y' pixels. The image file would not include the border region 230 as this area would have been cropped from the image in order to simplify the HW processing. Although the HW may not process the border pixels 230, they may still be used when processing the pixels in the smaller image 220.

The image may also contain ROI areas 240. These ROI areas 240 may include highly detailed images, e.g., faces, moving objects, etc., or other image features that may benefit from more complex processing.

Exemplary embodiments in accordance with this invention allow for an image file that contains the full captured image 210.

Figure 3:
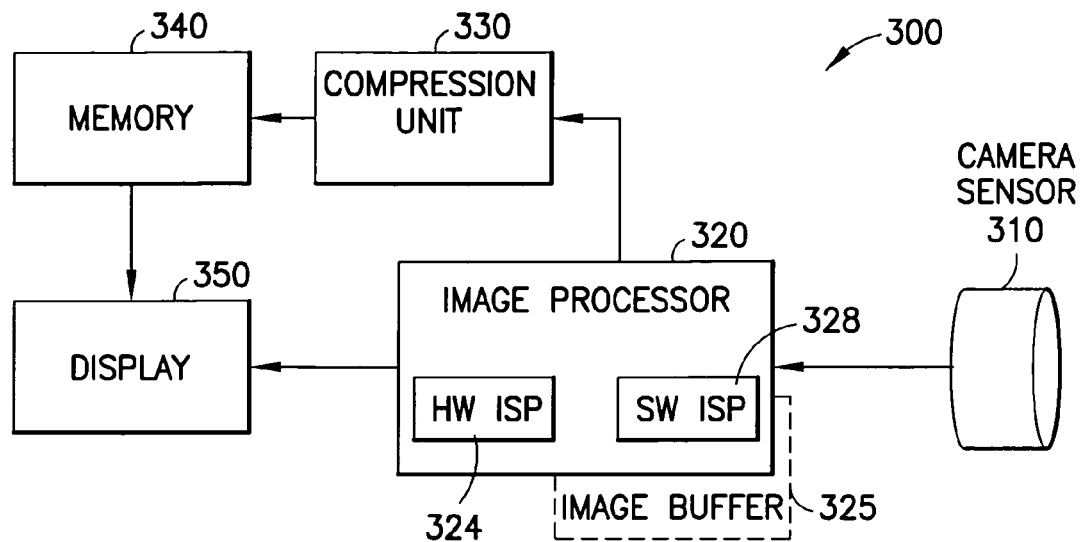
FIG. 3 illustrates a simplified block diagram of an electronic device that is suitable for use in practicing the exemplary embodiments of this invention.

As shown in FIG. 3, a camera system 300 in accordance with this invention may contain at least one camera image sensor 310, an image processing engine (also called an ISP) 320, a compression engine 330, memory 340 for storing an image file and an optional display 350. The image processor unit 320 includes a hardware processor 324 and a software processor 328. The image processor unit 320 may also include an image buffer 325.

As before, the camera sensor 310 captures an image. The image is read from the camera sensor 310 to the ISP 320, where it may be buffered in image buffer 325. The ISP 320 selectively processes the image in a HW ISP 324 and a SW ISP 328. The results are combined to generate the processed image.

The image can be compressed by compression unit 330 and then stored in memory 340. Additionally, the image may also be displayed on the display 350 either directly from the ISP 320 or from memory 340. When the image is displayed some additional processing steps may also be needed (e.g. decompression, scaling, color processing, display enhancements, etc.).

SW processing may be done within a host processor, application processor, DSP processor, vector processor, SIMD processor, FPGA, GPU, etc. by providing instructions or algorithms to the processor to perform the needed functionality.

Figure 4:
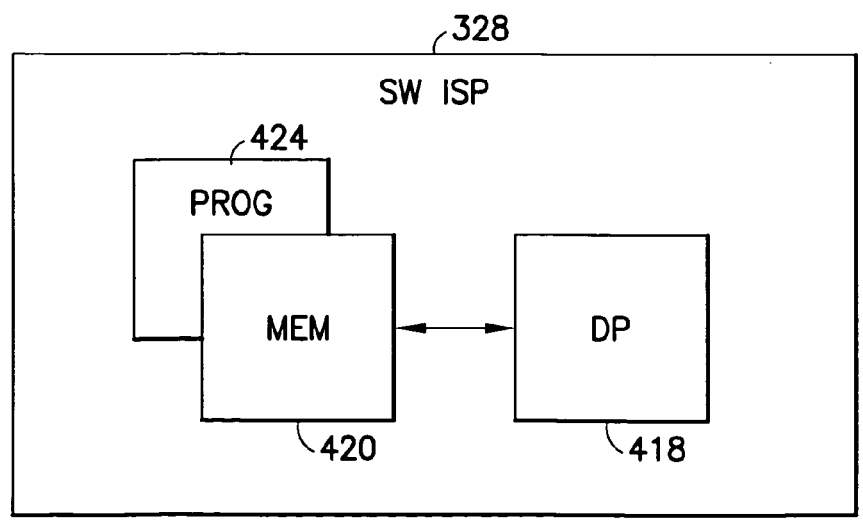
FIG. 4 illustrates a simplified block diagram of a software image processor that is suitable for use in practicing the exemplary embodiments of this invention.

Reference is made to FIG. 4 for illustrating a simplified block diagram of a SW ISP 328 that is suitable for use in practicing the exemplary embodiments of this invention. In FIG. 4, the SW ISP 328 includes a data processor (DP) 418 and a memory (MEM) 420 coupled to the DP 418. The MEM 420 stores a program (PROG) 424. PROGs 424 includes program instructions that, when executed by the DP 418, enable the SW ISP 328 to operate in accordance with the exemplary embodiments of this invention, as discussed herein.

HW processing may be performed using fixed hardwired operations to be applies to the image pixels. The HW ISP 324 may also be implemented so that HW comprises vector processors, GPU, FPGA or SIMD processors.

The memory 340, 420 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

The processors 418, 328 may be of any type suitable to the local technical environment, and may include one or more of general purpose computers, special purpose computers, microprocessors, digital signal processors (DSPs) and processors based on a multi-core processor architecture, as non-limiting examples.

Camera system 300 may be incorporated into many devices, for example, cellular phones, personal digital assistants (PDAs), portable computers, gaming devices and a variety of image capture devices, as non-limiting examples.

In an exemplary embodiment in accordance with this invention, the full raw image from the camera sensor 310 is first stored to the image buffer 325. The image buffer 325 can contain PCM values or it can be in a compressed form, e.g., DPCM/PCM, LUT, etc.

From the image buffer 325 the image may be processed in the image processor 320. The image processor 320 processes some of the image pixels using the HW ISP 324. The pixels that would benefit from SW processing (e.g. border pixels or ROI pixels) are processed within the SW ISP 328. These differently processed pixels (or pixel areas) are then combined together to form the full output image. If the same area is processed within both the SW ISP and the HW ISP (e.g. a full image is processed in the HW ISP and ROI areas are processed in the SW ISP) then the SW processed image pixels in this area may be used to replace the HW processed image pixels.

In some embodiments, only a partial raw image is stored, thus reducing the processing and memory requirements.

Additionally, the output image may be subjected to additional processing. There may be other processing steps (or functions) applied to the image within the SW ISP 328 or within the HW ISP 324 for all the image pixels. Some functions may require separate SW or HW processing (e.g. noise reduction, CFAI, sharpening, etc.).

In exemplary embodiments in accordance with this invention, full HW processing may be used for the center image area and full SW processing may be used for border image areas.

Figure 5:
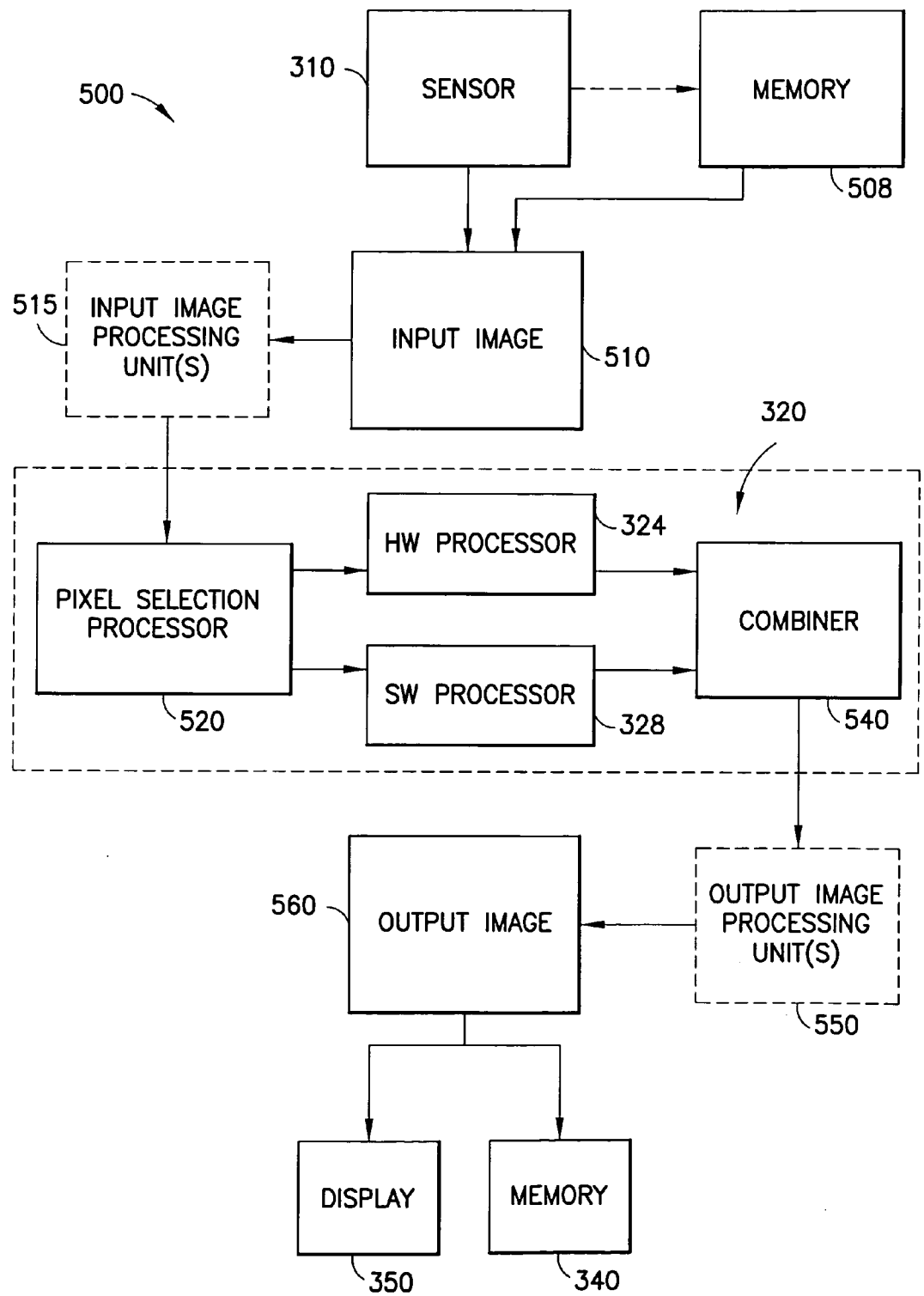
FIG. 5 illustrates a simplified block diagram of an electronic device that is suitable for use in practicing the exemplary embodiments of this invention.

Reference is made to FIG. 5 for illustrating a simplified block diagram of a second device that is suitable for use in practicing the exemplary embodiments of this invention. In FIG. 5, an input image 510 may be received from either a camera image sensor 310, a first memory 508 (e.g., a buffer, a hard drive, etc.). The processing unit 320 includes a pixel selection processor 520 that selects pixels in the input image 510 based on the context of the pixels. A first set of pixels from the input image 510 are then processed in a hardware based processor 324 and a second set of pixels from the input image 510 are then processed using a software (or algorithm) based processor 328. After processing, the first and second sets of pixels are combined by combiner 540. The resulting output image 560 may be stored in a second memory 340, output in display 350, or both.

Input image processing units 515 may provide additional processing functions (e.g., linearization, pedestal elimination, shading compensation, noise reduction, etc.) to input image 510 before processing by the processing unit 320 and output image processing units 550 may provide further processing functions (e.g., file compression, zooming, scaling, sharpening, color conversion, color processing, non-linearization, etc.) after processing by the processing unit 320. The processing functions of the input image processing units 515 and output image processing units 550 may be implemented by using SW-based processing, HW-based processing or a combination of the two.

Pixel selection processor 520 may be configured to select pixels based on various contexts of the pixels in the input image 510. These contexts may be defined to include pixels located in border regions areas 230 of the input image 510. Additionally, the context may be defined as a ROI area 240. Pixel selection processor 520 may be further configured to identify ROI areas 240 based on facial recognition, object tracking, processing requirements or other processes.

Pixel selection processor 520 may select pixels based on multiple contexts (e.g., selecting both pixels located in border regions areas 230 and pixels located in ROI areas 240. The software (or algorithm) based processor 328 may process pixels of both contexts or, as a non-limiting example, SW Processor 328 may include sub-processors (not shown) to process pixels based upon the context (e.g., a first sub-processor for pixels located in border regions areas 230 and a second sub-processor for pixels located in ROI areas 240).

Although shown separately, the individual processors of processing unit 320 may be implemented as one or more processing units. As a non-limiting example, pixel selection processor 520 and combiner 540 may be embodied in a single processing unit or a combination of multiple processing units.

Exemplary embodiments in accordance with this invention provide a number of advantages. Since the most of the image pixels are processes within the HW ISP 324, latencies are small. The HW ISP 324 may be implemented with a reduced size as the more complex (e.g., border or ROI) areas are processed within the SW ISP 328. All of the original camera input pixels can be used to produce a full size output image. Additionally, the higher image quality for the ROI areas allows higher zooming factors to be used for the same output image size.

Figure 6:
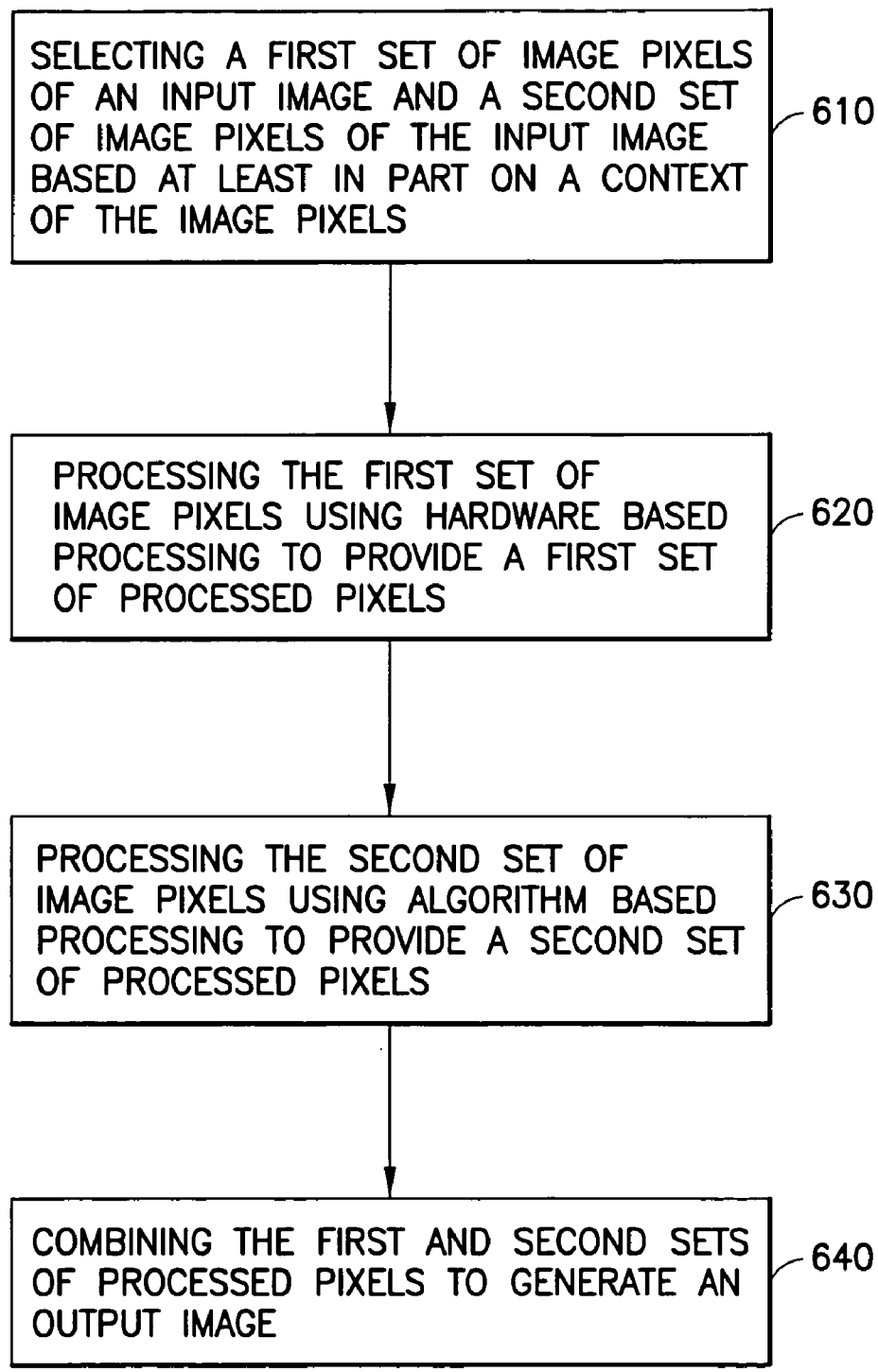
FIG. 6 depicts a flowchart illustrating one non-limiting example of a method for practicing the exemplary embodiments of this invention.

FIG. 6 depicts a flowchart illustrating a non-limiting example of a method for processing an image in accordance the exemplary embodiments of this invention. At 610, a first set of image pixels and a second set of image pixels are selected from an input image based on the context of the image pixels. The first set of image pixels are processed using hardware based processing to provide a first set of processed pixels at 620. At 630, the second set of image pixels are processed using algorithm (or software) based processing to provide a second set of processed pixels. The first and second sets of processed pixels are combined to generate an output image at 640.

An exemplary embodiment in accordance with this invention is a method for imaging processing. The method includes selecting a first set of image pixels of an input image and a second set of image pixels of the input image based at least in part on a context of the image pixels. Processing the first set of image pixels using hardware based processing to provide a first set of processed pixels is also included in the method. The method includes processing the second set of image pixels using algorithm based processing to provide a second set of processed pixels. The processed sets of pixels are combined to generate an output image.

In a further exemplary embodiment of the method above, the context of the image pixels includes being located in a border area of the input image. The second set of image pixels may include pixels having this context.

In an additional exemplary embodiment of any of the methods above, the context of the image pixels includes being located in one or more region of interest areas. The second set of image pixels may include pixels having this context.

In a further exemplary embodiment of any of the methods above, the method also includes analyzing at least a portion of the input image and/or one or more previous images using face detection processing to detect the context of the pixels and selecting image pixels in the input image determined to represent a face to be part of the second set of image pixels.

In an additional exemplary embodiment of any of the methods above, the method also includes analyzing at least a portion of the input image and/or one or more previous images using object tracking processing and selecting image pixels of the input image determined to represent a tracked object to be part of the second set of image pixels.

In a further exemplary embodiment of any of the methods above, combining the first and second sets of processed pixels includes replacing processed pixels in the first set of processed pixels with corresponding processed pixels in the second set of processed pixels.

In an additional exemplary embodiment of any of the methods above, the method also includes processing the output image to perform file compression, zooming, scaling, color conversion, color processing, noise reduction, and/or image sharpening.

In an further exemplary embodiment of any of the methods above, the method also includes processing the input image to perform linearization, pedestal elimination, shading compensation and/or noise reduction.

A further exemplary embodiment in accordance with this invention is an apparatus for imaging processing. The apparatus including a first processing unit to select a first set of image pixels of an input image and a second set of image pixels of the input image based at least in part on a context of the image pixels. A second processing unit is included to process the first set of image pixels using hardware based processing to provide a first set of processed pixels. The apparatus includes a third processing unit to process the second set of image pixels using algorithm based processing to provide a second set of processed pixels. A fourth processing unit is configured to join the first and second sets of processed pixels to generate an output image is included.

In an additional exemplary embodiment of the apparatus above, the context of the image pixels includes being located in a border area of the input image and/or in region of interest areas. The second set of image pixels may include pixels having this context.

In a further exemplary embodiment of any of the apparatus above, the first processing unit also analyzes at least a portion of the input image and/or one or more previous images using face detection processing and selects image pixels in the input image detected to represent a face to be part of the second set of image pixels.

In an additional exemplary embodiment of any of the apparatus above, the first processing unit also analyzes at least a portion of the input image and/or one or more previous images using object tracking processing and selects image pixels from the input image detected to represent a tracked object to be part of the second set of image pixels.

In a further exemplary embodiment of any of the apparatus above, the fourth processing unit exchanges processed pixels in the first set of processed pixels with corresponding processed pixels in the second set of processed pixels when combining the first and second sets of processed pixels.

In an additional exemplary embodiment of any of the apparatus above, the apparatus also includes one or more additional processing units to process the output image to perform file compression, zooming, scaling, color conversion, color processing, noise reduction and/or sharpening.

In an further exemplary embodiment of any of the apparatus above, the apparatus also includes one or more additional processing units to process the input image to perform linearization, pedestal elimination, shading compensation and/or noise reduction.

A further exemplary embodiment in accordance with this invention is a computer-readable medium tangibly embodying program instructions, execution of the program instructions resulting in operations for imaging processing. The program instructions resulting in operations including selecting a first set of image pixels of an input image and a second set of image pixels of the input image based at least in part on one or more context of the image pixels. The first set of image pixels are processed using hardware based processing to provide a first set of processed pixels. The second set of image pixels are processed using algorithm based processing to provide a second set of processed pixels. The program instructions include merging the first and second sets of processed pixels to generate an output image.

In an additional exemplary embodiment of the computer-readable medium above, the contexts of the image pixels include being located in a border area of the input image and/or in region of interest areas. The second set of image pixels may include pixels having either of these contexts.

In a further exemplary embodiment of any of the computer-readable media above, the program instructions also include analyzing at least a portion of the input image and/or one or more previous images using face detection processing and selecting image pixels in the input image determined to represent a face to be part of the second set of image pixels.

In an additional exemplary embodiment of any of the computer-readable media above, the program instructions also include analyzing at least a portion of the input image and/or one or more previous images using object tracking processing and selecting image pixels of the input image determined to represent a tracked object to be part of the second set of image pixels.

In a further exemplary embodiment of any of the computer-readable media above, the program instructions also include switching processed pixels in the first set of processed pixels with corresponding processed pixels in the second set of processed pixels when combining the first and second sets of processed pixels.

In an additional exemplary embodiment of any of the computer-readable media above, the program instructions also include one or more additional processing steps to process the output image to provide file compression, noise reduction, zooming, scaling, color conversion, color processing and/or sharpening.

In an further exemplary embodiment of any of the computer-readable media above, the program instructions also includes processing the input image to perform linearization, pedestal elimination, shading compensation and/or noise reduction.

A further exemplary embodiment in accordance with this invention is an apparatus for imaging processing. The apparatus includes means for selecting a first set of image pixels of an input image and a second set of image pixels of the input image based at least in part on a context of the image pixels. Means for processing the first set of image pixels using hardware based processing to provide a first set of processed pixels is included. The apparatus includes means for processing the second set of image pixels using algorithm based processing to provide a second set of processed pixels. Means for combining the first and second sets of processed pixels to generate an output image is included.

In an additional exemplary embodiment of the apparatus above the selecting means is a processing unit, the hardware based processing means is a processing unit, the algorithm based processing means is a processing unit and the combining means is a processing unit.

In a further exemplary embodiment of any of the apparatus above, the selecting means includes means for performing face detection for selecting pixels associated with a detected face to be included in the second set of pixels.

In an additional exemplary embodiment of any of the apparatus above, the selecting means includes means for performing object tracking for selecting pixels associated with a tracked object to be included in the second set of pixels.

In a further exemplary embodiment of any of the apparatus above, the selecting means includes means for determining a border area for selecting pixels associated with the border area to be included in the second set of pixels.

The exemplary embodiments of the invention, as discussed above and as particularly described with respect to exemplary methods, may be implemented as a computer program comprising program instructions embodied on a tangible computer-readable medium. Execution of the program instructions results in operations comprising steps of utilizing the exemplary embodiments or steps of the method.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Still further, the various labels used are not intended to be limiting in any respect, as these labels may be identified by any suitable names.

Programs may automatically route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   selecting a first set of image pixels of an input image and a second set of image pixels of the input image based at least in part on a context of the image pixels, where the second set of image pixels is less than all of the image pixels of the input image;
   processing the first set of image pixels using hardware based processing to provide a first set of processed pixels, where hardware based processing is performed by performing fixed hardwired operations on the image pixels of first set;
   processing the second set of image pixels using algorithm based processing to provide a second set of processed pixels, where algorithm based processing is performed by executing program instructions to perform operations on the image pixels of second set; and
   combining the first and second sets of processed pixels to generate an output image.

2. The method of claim 1, where the context of the image pixels comprises being located in a border area of the input image.

3. The method of claim 2, where the second set of image pixels comprises pixels having the context.

4. The method of claim 1, where the context of the image pixels comprises being located in at least one region of interest.

5. The method of claim 4, where the second set of image pixels comprises pixels having the context.

6. The method of claim 1, further comprising:
analyzing at least a portion of the input image using face detection processing, and
selecting image pixels determined to represent a face to be part of the second set of image pixels.

7. The method of claim 1, further comprising:
analyzing at least a portion of the input image using object tracking processing, and
selecting image pixels determined to represent a tracked object to be part of the second set of image pixels.

8. The method of claim 1, where combining the first and second sets of processed pixels comprises replacing processed pixels in the first set of processed pixels with corresponding processed pixels in the second set of processed pixels.

9. The method of claim 1, further comprising processing the output image to perform at least one of file compression, noise reduction, zooming, scaling, color conversion, color processing and sharpening.

10. The method of claim 1, further comprising processing the input image to perform at least one of linearization, pedestal elimination, shading compensation and noise reduction.

11. An apparatus comprising:
a first processing unit configured to select a first set of image pixels of an input image and a second set of image pixels of the input image based at least in part on a context of the image pixels, where the second set of image pixels is less than all of the image pixels of the input image;
a second processing unit configured to process the first set of image pixels using hardware based processing to provide a first set of processed pixels, where hardware based processing is performed by performing fixed hardwired operations on the image pixels of first set;
a third processing unit configured to process the second set of image pixels using algorithm based processing to provide a second set of processed pixels, where algorithm based processing is performed by executing program instructions to perform operations on the image pixels of second set; and
a fourth processing unit configured to combine the first and second sets of processed pixels to generate an output image.

12. The apparatus of claim 11, where the context of the image pixels comprises being located in at least one of a border area of the input image and at least one region of interest.

13. The apparatus of claim 12, where the second set of image pixels comprises pixels having the context.

14. The apparatus of claim 11, where the first processing unit is further configured to analyze at least a portion of the input image using face detection processing, and
to select image pixels determined to represent a face to be part of the second set of image pixels.

15. The apparatus of claim 11, where the first processing unit is further configured to analyze at least a portion of the input image using object tracking processing, and
to select image pixels determined to represent a tracked object to be part of the second set of image pixels.

16. The apparatus of claim 11, where the fourth processing unit is further configured to replace processed pixels in the first set of processed pixels with corresponding processed pixels in the second set of processed pixels when combining the first and second sets of processed pixels.

17. The apparatus of claim 11, further comprising at least one additional processing unit configured to process the output image to perform at least one of file compression, noise reduction, zooming, scaling, color conversion, color processing and sharpening.

18. The apparatus of claim 11, further comprising at least one additional processing unit configured to process the input image to perform at least one of at least one of linearization, pedestal elimination, shading compensation and noise reduction.

19. A non-transitory computer-readable medium tangibly embodying program instructions, execution of the program instructions resulting in operations comprising:
selecting a first set of image pixels of an input image and a second set of image pixels of the input image based at least in part on a context of the image pixels, where the second set of image pixels is less than all of the image pixels of the input image;
processing the first set of image pixels using hardware based processing to provide a first set of processed pixels, where hardware based processing is performed by performing fixed hardwired operations on the image pixels of first set;
processing the second set of image pixels using algorithm based processing to provide a second set of processed pixels, where algorithm based processing is performed by executing program instructions to perform operations on the image pixels of second set; and
combining the first and second sets of processed pixels to generate an output image.

20. The computer-readable medium of claim 19, where the context of the image pixels comprises being located in at least one of a border area of the input image and at least one region of interest.

21. The computer-readable medium of claim 20, where the second set of image pixels comprises pixels having the context.

22. The computer-readable medium of claim 19, where the operations further comprise:
analyzing at least a portion of the input image using face detection processing, and
selecting image pixels determined to represent a face to be part of the second set of image pixels.

23. The computer-readable medium of claim 19, where the operations further comprise:
analyzing at least a portion of the input image using object tracking processing, and
selecting image pixels determined to represent a tracked object to be part of the second set of image pixels.

24. The computer-readable medium of claim 19, where combining the first and second sets of processed pixels comprises replacing processed pixels in the first set of processed pixels with corresponding processed pixels in the second set of processed pixels.

25. The computer-readable medium of claim 19, where the operations further comprise processing the output image to perform at least one of file compression, noise reduction, zooming, scaling, color conversion, color processing and sharpening.

26. The computer-readable medium of claim 19, where the operations further comprise processing the input image to perform at least one of at least one of linearization, pedestal elimination, shading compensation and noise reduction.

27. An apparatus comprising:
means for selecting a first set of image pixels of an input image and a second set of image pixels of the input image based at least in part on a context of the image pixels, where the second set of image pixels is less than all of the image pixels of the input image;
means for processing the first set of image pixels using hardware based processing to provide a first set of processed pixels, where hardware based processing is performed by performing fixed hardwired operations on the image pixels of first set;

means for processing the second set of image pixels using algorithm based processing to provide a second set of processed pixels, where algorithm based processing is performed by executing program instructions to perform operations on the image pixels of second set; and means for combining the first and second sets of processed pixels to generate an output image.

28. The apparatus of claim 27, where the selecting means comprises means for performing face detection for selecting those pixels associated with a detected face to comprise the second set of pixels.

29. The apparatus of claim 27, where the selecting means comprises means for performing object tracking for selecting those pixels associated with a tracked object to comprise the second set of pixels.

30. The apparatus of claim 27, where the selecting means comprises means for determining a border area for selecting those pixels associated with the border area to comprise the second set of pixels.

* * * * *